United States Patent Office 3,449,462
Patented June 10, 1969

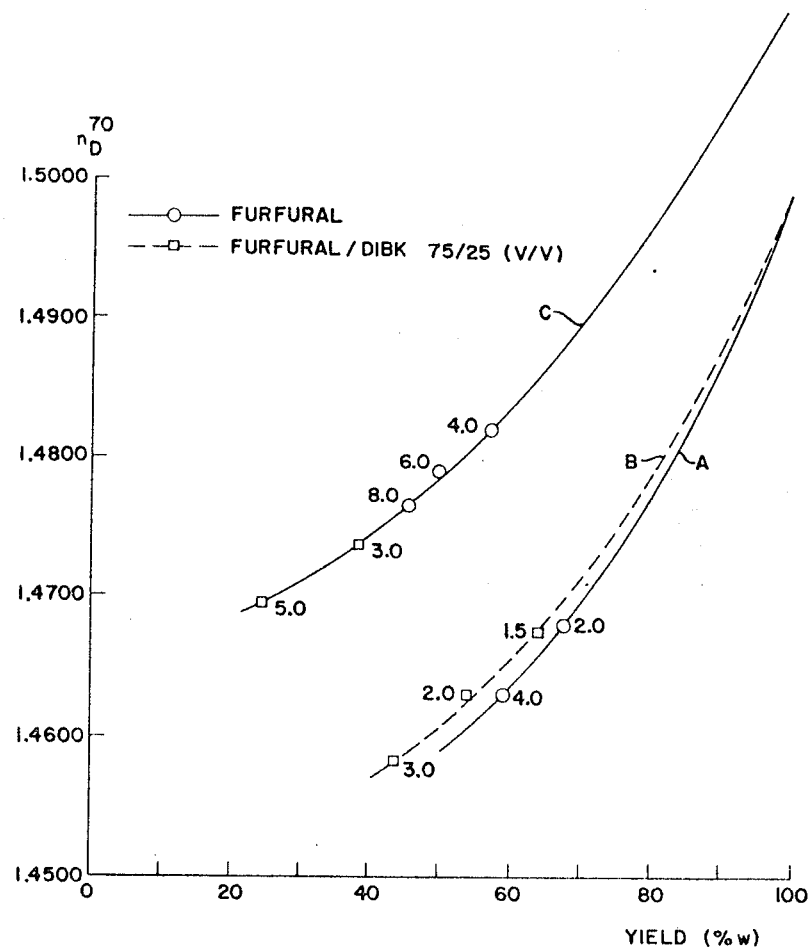

3,449,462
SEPARATION PROCESS
Lucas Alders and Werner Ridderikhoff, Amsterdam, Netherlands, assignors to Shell Oil Company, New York, N.Y., a corporation of Delaware
Filed Nov. 2, 1966, Ser. No. 591,624
Claims priority, application Netherlands, Nov. 2, 1965, 6514174
Int. Cl. C07c *15/00, 11/02, 15/12*
U.S. Cl. 260—674                                    17 Claims

ABSTRACT OF THE DISCLOSURE

Aromatic hydrocarbons, oxygen-, sulfur-, and nitrogen-containing compounds are separated from fractions containing same by extraction with a solvent consisting essentially of furfural and one or more ketones.

This invention relates to a process for the separation of mixtures of organic compounds by means of a selective solvent. More particularly, this invention relates to the separation and recovery of a certain organic compound or a group of organic compounds. The separation is based on the fact that one or more compounds of the mixture, by virtue of its higher polarity or polarizability, will have a greater solubility in the selective solvent than the other compounds of the mixture.

The problem of the separation of mixtures of organic compounds is of frequent occurrence, in the chemical and pharmaceutical industries as well as in the mineral oil industry. In this connection many selective solvents have already been proposed, however, only few of these solvents, have found practical application. This is mainly due to the fact that most solvents fail in one or more properties necessary for application on a technical scale. A selective solvent suitable for a wide application should first of all have a high solvency, a low light-heavy selectivity and a good group selectivity. In addition, the solvent should, depending on the separation in question, meet the following requirements as well: (a) have a boiling point or another physical property which permits a ready recovery of the solvent, (b) a sufficient difference in density with the raffinate phase, (c) have not too high a viscosity, (d) be chemically inert (both with respect to the mixture to be separated and to the apparatus), (e) have sufficient thermal stability, (f) possess low volatility and (g) have not too high a cost price.

A well-known selective solvent, which is applied for various extractive purposes on a technical scale and which meets most of the above requirements is furfural. A certain drawback of furfural, however, is that it is relatively costly. This renders it necessary to recover the furfural as completely as possible from each application. This applies in particular to uses, such as in the mineral oil industry, where large quantities of the selective solvent are required and only relatively small losses of solvent are permissible because they would lead to an undesired increase in costs of the process. Losses as a rule occur during recovery and in particular when the extracted material has a higher boiling point than furfural. This is because furfural is distilled from the extract phase, as a consequence of which it is exposed to relatively high temperatures for long periods of time. To minimize thermal decomposition of furfural the distillation is usually performed in the presence of water. One then mostly obtains two fractions, namely a dry furfural fraction, which is recycled as such to the extraction system, and a moist fraction from which the water has to be separated before the furfural can be recycled to the system. The above mode of recovery involves losses of furfural through formation of conversion products in which polymerization and oxidation reactions play a role. These conversion products may cause corrosion, while in addition they may form coke-like deposits, for example in heat exchangers.

It has now been found that the above problems can be minimized by using a novel solvent consisting essentially of a mixture of furfural and one or more ketones. As will be explained in greater detail, this mixture of solvents has great advantages over furfural alone, both as regards extractive properties and thermal stability. The drawing will be further explained in the examples and illustrates the advantages of the mixed solvent over furfural alone.

The invention therefore relates to a process for the separation of mixtures of organic compounds by means of a selective solvent containing furfural. More particularly the separation process is effected by contacting the organic compounds with a solvent mixture of furfural and one or more ketones thereby forming two phases which are subsequently separated.

With respect to the extractive properties of the mixture of furfural and ketones of this invention, it can first of all be observed that, at the same selectivity as furfural, it has in general a better solvency than furfural alone. This may in certain cases be an advantage, for example, when high-boiling hydrocarbon oil distillates or residual hydrocarbon oil fractions are to be extracted the solvency of furfural fails and relatively high solvent ratios have to be applied.

Another advantage of the invention is due to the fact that the somewhat higher solvency of the solvent mixtures under discussion renders it possible to perform the extraction, if required, at lower temperatures than when using furfural alone.

These features are definitely advantageous in those cases where the extraction with furfural alone would have to be performed at relatively high temperatures. The possibility of performing the extraction with the solvent mixtures, while retaining a sufficient solvency, at lower temperatures is highly desirable. For example, operation at a lower temperature substantially prevents undesirable conversions of thermally unstable compounds present in the mixture and enables the separation of any such products formed more efficiently. It also restricts the formation of conversion products of furfural with certain reactive compounds present in the mixture to be separated.

An additional advantage of the solvent mixtures of the invention over furfural alone is the possibility of adapting the extractive properties of the mixture to specific purposes. This is possible by (a) selecting the ketones and (b) varying the quantity of the ketone in the solvent mixture. In this way a relatively great influence can be exercised on the solvency, as well as on the selectivity of the solvent mixtures.

Another very surprising advantage of the invention is that to reach the same extraction result as when using furfural alone the necessary quantity of solvent mixture is in general much smaller. This will be made more apparent from extraction experiments described in the examples. It was found that when extracting a lube oil distillate with a mixture of furfural and diisobutyl ketone (volume ratio 3:1) it was sufficient to use a quantity of solvent mixture which was less than 50% of that required when using furfural alone to obtain the same yield of raffinate. This is advantageous since, at the same throughput, a smaller plant will suffice.

Ketones, which may be used according to the invention are those which, under the conditions applied, are inert or practically inert towards the organic compounds to be separated. In addition, the ketones should, under these conditions, be preferably completely miscible with furfural. Aliphatic and aromatic ketones, having excellent thermal stability, are very suitable. This stability is an advantage when working up the solvent mixture from an extract phase or in extractive distillations since there will be little if any decomposition.

As a rule ketones with a boiling point in the range between 120 and 250° C. will be used. Particularly suitable are ketones whose boiling points differ relatively little from that of furfural. i.e., in the range from 140 to 180° C. For example, application of ketones with a lower boiling point than furfural is useful if the solvent mixture is to be recovered from a phase containing extracted compounds with a boiling point higher than that of furfural. In distilling off the solvent mixture the lower-boiling ketone then serves as stripping medium for the furfural. Not only is the distillation thus facilitated, but also the risk of decomposition of furfural is reduced. Conversely, ketones with a boiling point higher than that of furfural can be used in cases where the extracted compounds have a boiling point lower than furfural.

The solvent mixtures according to the invention can be used for the same purposes as are known for furfural alone, i.e., liquid-liquid extractions, extractive distillations and absorption of gases.

As a rule the solvent mixtures contain at least 10 percent by volume of ketone and preferably between about 15 to 30 percent by volume of ketone. The percentage to be used in a given case depends, among other things, on the nature of the mixture to be separated. This percentage also influences the solvency of the solvent mixture.

Satisfactory results are obtained when the volume ratio of the solvent mixture to the mixture of organic compounds to be separated is between 1:2 and 10:1 and preferably between 1:1 and 5:1.

As suitable ketones can be mentioned:

methyl-n-butyl ketone (2-hexanone)
methyl-n-amyl ketone (2-heptanone)
ethyl-n-butyl ketone (3-heptanone)
di-n-propyl ketone (4-heptanone)
diisopropyl ketone
ethyl isoamyl ketone
methyl-n-hexyl ketone (2-octanone)
methyl isohexyl ketone (6-methyl-2-heptanone)
diisobutyl ketone
methyl-n-nonyl ketone
cyclohexanone.

As suitable starting materials which are to be separated according to the invention are mixtures of organic compounds in which at least one component has a higher polarity or polarizability than the other components in the mixture. Thus, polar compounds containing oxygen, sulfur and/or nitrogen can be separated from hydrocarbons. When the mixture to be separated consists exclusively of hydrocarbons of different structure, the decreasing solubility in the solvent mixture of the invention permits a separation into classes of compounds in the following order: polyaromatics, aromatics, cycloolefins, olefins, naphthenes and aliphatic hydrocarbons.

Hydrocarbons which may be separated according to the process of the invention are: hydrocarbon oil fractions obtained by direct distillation, by thermal or catalytic cracking or by hydrocracking, e.g., the separation of aromatic compounds from gas oil and lube oil fractions. The extraction of low boiling aromatic containing hydrocarbon oil fractions with the solvent mixtures of the invention yields substantially pure aromatic hydrocarbons such as benzene and toluene. Such an extraction is of obvious importance to the chemical industry.

The extractions are preferably performed in a mult-stage countercurrent system. A column filed with packing material or provided with perforated plates is suitable. Preferably, however, a column is used with a rotating shaft provided with discs as described in British Patent 690,730.

In performing extractions, extractive distillations and absorptions the selectivity of the solvent mixtures can, if desired, be increased by using an anti-solvent such as water or methanol.

When separating mixtures of organic compounds in a mult-stage counter-current extraction system a wash liquid can, if desired, be used. Paraffinic hydrocarbons are in general suitable for this application.

Example I

Comparative extraction experiments were performed, one with furfural and the other with a mixture of 75 parts by volume of furfural and 25 parts by volume of diisobutyl ketone. The feed was a lubricating oil fraction with a boiling range of 475–525° C., obtained by direct distillation of a crude oil. The experiments were performed continuously in a vertical column filled with Berl saddles. The top temperature was kept at 80° C. and the bottom temperature at 55° C.

In order to compare the extractive properties of the two solvents, extractions were performed with various solvent ratios.

The solvent was fed in near the top and the feed near the bottom of the column. The feed rate was 750 ml./hour, the solvent forming the continuous phase. The discharging extract and raffinate phases were analyzed after the stationary state had been reached.

The results are represented in the drawing. Curve $a$ indicates the changes in yield of raffinate, obtained with furfural in various solvent ratios. The yields in percent by weight have been plotted against the raffinate quality, expressed by the refractive indices.

Curve $b$ correspondingly shows the changes in yield obtained with the furfural/diisobutyl ketone mixture.

On the basis of these experimental results the following conclusions can be drawn:

(1) Under the given temperature conditions the selectivity of the mixed solvent differs only slightly from that of furfural; this follows from the position of curves $a$ (furfural) and $b$ (solvent mixture).

(2) The mixed solvent has a much better solvency than furfural, i.e., at equal raffinate yields the quantity of solvent required is considerably smaller.

In regards to this example the following comments are made.

On the basis of known views on solvent extractions it can be stated that the selectivity of a solvent is co-determined by the temperature at which the reaction is performed and that this selectivity can be increased by performing the extraction at a lower temperature. In the present case it is therefore possible by temperature variation to set the same selectivities as obtained with furfural. When using furfural-ketone mixtures, which have a relatively higher solvency, somewhat lower extraction temperatures can be used. In the above extraction with the furfural/diisobutyl ketone mixture, it is possible to obtain a selectivity similar to that of furfural by reducing the extraction temperature by about 20° C.

Example II

According to the procedure described in Example I extractions were once more performed with furfural and with a mixture of 75 parts by volume of furfural and 25 parts by volume of diisobutyl ketone, using a deasphalted hydrocarbon oil fraction with a boiling range of 525–550° C. as a starting materal. The feed rate was 300 ml./hour.

The results of the experiments, which were all performed under the same conditions and at equal temperatures (top temperature 110° C. and bottom temperature 85° C.) are shown by curve $c$ of the drawing. These results show that the curves relating the yield of raffinate and the purity thereof coincide. Another noteworthy feature is that the solvent ratios for the furfural-ketone mixture, to obtain a similar product, are only half to one third of those necessary when using furfural alone.

A comparison of the experimental results of Examples I and II obtained with hydrocarbon fractions with boiling ranges 475–525° C. and 525–550° C. respectively, shows that at equal selectivities, the difference in solvency becomes more pronounced as the boiling point or the molecular weight of the feed increases. This indicates that, at the same selectivity according to hydrocarbon type, the light-heavy selectivity of the solvent mixture is distinctly more favorable than for furfural. An additional advantage therefore is that the solvent mixture permits extraction of fractions with wider boiling ranges than furfural alone. For higher-boiling fractions it is further of great importance that at relatively low temperatures, i.e., while retaining selectivity, the solvent ratios can now be relatively low, even in those cases where a thorough removal of aromatics is desirable. The high solvency therefore also does away with the necessity of using high extraction temperatures.

We claim as our invention:

1. A process for the separation of a mixture of organic compounds which comprises contacting the organic compound mixture with a selective mixed solvent consisting essentially of furfural and one or more ketones to form two phases and subsequently separating the phases thus formed.

2. A process according to claim 1 wherein the ketones are aliphatic or aromatic and have a boiling point between about 120 and 250° C.

3. A process according to claim 2 wherein the ketones have a boiling point between about 140 and 180° C.

4. A process according to claim 2 wherein the mixed solvent contains at least 10% by volume of ketone.

5. A process according to claim 4 wherein the mixed solvent contains about 15 to 30% by volume of ketone.

6. A process according to claim 4 wherein the volume ratio of the mixed solvent to the mixture of organic compounds to be separated is between about 1:2 and 10:1.

7. A process according to claim 4 wherein the mixture of organic compounds to be separated contains at least one component or group of components having a polarity or polarizability higher than that of the other compounds of the mixture.

8. A process according to claim 7 wherein the mixture to be separated consists of hydrocarbons with oxygen, sulfur or nitrogen containing compounds as polar components.

9. A process according to claim 7 wherein the mixture to be separated consists of a hydrocarbon oil fraction containing aromatic hydrocarbons.

10. A process according to claim 9 wherein the aromatic hydrocarbons consist of benzene or toluene.

11. A process according to claim 7 wherein the mixture of organic compounds to be separated is a gas oil fraction.

12. A process according to claim 7 wherein the mixture of organic compounds to be separated is a lube oil fraction.

13. A process according to claim 7 wherein the ketones used are selected from the group consisting of methyl-n-amyl ketone, ethyl isoamyl ketone, di-n-propyl ketone, diisopropyl ketone and diisobutyl ketone.

14. A process according to claim 7 wherein if the compounds to be separated by the mixed solvent have a boiling point higher than furfural the ketone portion of the mixed solvent has a boiling point lower than furfural.

15. A process according to claim 7 wherein if the compounds to be separated by the mixed solvent have a boiling point lower than furfural the ketone portion of the mixed solvent has a boiling point higher than furfural.

16. A process according to claim 4 wherein the separation is effected by extraction of the mixed organic compounds with the mixed solvent in a multi-stage counter-current zone.

17. A process according to claim 16 wherein the multi-stage counter-current zone consists of a column in which a rotating shaft provided with discs has been fitted.

References Cited

UNITED STATES PATENTS

| | | | |
|---|---|---|---|
| 2,935,469 | 5/1960 | Vose | 260—674 XR |
| 2,963,429 | 12/1960 | Morin et al. | 260—674 XR |
| 3,287,260 | 11/1966 | Gross et al. | 260—674 XR |
| 3,291,727 | 12/1966 | Woodle et al. | 260—674 XR |

DELBERT E. GANTZ, *Primary Examiner.*

CURTIS R. DAVIS, *Assistant Examiner.*

U.S. Cl. X.R.

208—323, 327, 332